(12) United States Patent
Salsich et al.

(10) Patent No.: US 8,378,249 B2
(45) Date of Patent: Feb. 19, 2013

(54) METHOD AND APPARATUS FOR PROPORTIONAL VALVE ACTUATION IN A PLASMA CUTTER

(75) Inventors: Anthony V. Salsich, Appleton, WI (US); David P. Marcusen, Hortonville, WI (US); Nick William Buettner, Burlington, WI (US); Brian J. Bornemann, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1222 days.

(21) Appl. No.: 12/191,440

(22) Filed: Aug. 14, 2008

(65) Prior Publication Data
US 2009/0294413 A1 Dec. 3, 2009

Related U.S. Application Data

(60) Provisional application No. 61/056,993, filed on May 29, 2008.

(51) Int. Cl.
*B23K 10/00* (2006.01)

(52) U.S. Cl. ......... 219/121.39; 219/121.44; 219/121.59; 219/121.55

(58) Field of Classification Search ............. 219/121.39, 219/121.55, 121.54, 121.48, 75; 251/129.01, 251/129.02, 129.15, 129.08
See application file for complete search history.

(56) References Cited

U.S. PATENT DOCUMENTS

| | | | |
|---|---|---|---|
| 4,133,988 A | 1/1979 | Esibyan et al. | |
| 4,175,225 A | 11/1979 | Holko et al. | |
| 5,294,089 A * | 3/1994 | LaMarca | 251/30.02 |
| 5,424,507 A | 6/1995 | Yamaguchi | |
| 6,420,672 B1 | 7/2002 | Ulrich et al. | |
| 6,619,212 B1 * | 9/2003 | Stephan et al. | 104/292 |
| 6,622,058 B1 | 9/2003 | Picard et al. | |
| 6,689,983 B2 * | 2/2004 | Horner-Richardson et al. | 219/121.39 |
| 6,772,040 B1 * | 8/2004 | Picard et al. | 700/166 |
| 6,783,110 B2 * | 8/2004 | Hirota et al. | 251/129.21 |
| 6,960,737 B2 * | 11/2005 | Tatham | 219/121.5 |
| 7,389,968 B2 * | 6/2008 | Katoh et al. | 251/129.04 |
| 7,605,341 B2 * | 10/2009 | Higgins et al. | 219/121.55 |
| 2004/0069752 A1 | 4/2004 | Ulrich et al. | |
| 2006/0163216 A1 | 7/2006 | Brandt et al. | |
| 2006/0163220 A1 * | 7/2006 | Brandt et al. | 219/121.55 |
| 2008/0023449 A1 | 1/2008 | Salsich et al. | |

FOREIGN PATENT DOCUMENTS

| | | |
|---|---|---|
| DE | 19536150 A1 | 4/1997 |
| EP | 1655095 A2 | 5/2006 |

* cited by examiner

*Primary Examiner* — Mark Paschall
(74) *Attorney, Agent, or Firm* — Fletcher Yoder P.C.

(57) ABSTRACT

A system and method for automatically controlling gas pressure for a plasma cutter includes a plasma torch, a gas supply system to provide a pressurized gas to the plasma torch, and a proportional valve configured to regulate the pressurized gas. The proportional valve includes a body, a valve seat positioned therein and defining a valve orifice, and a plunger having a mating surface on one end that mates with the valve seat and the orifice and a pressure receiving surface on an opposite end. The proportional valve also includes an inlet to receive the pressurized gas and distribute the pressurized gas to the valve orifice and the pressure receiving surface of the plunger, an electrical solenoid having a chamber to electromagnetically translate the plunger therein, and a bias urging the plunger toward the valve orifice in conjunction with the pressurized gas when electrical power is reduced to the electrical solenoid.

21 Claims, 7 Drawing Sheets

METHOD AND APPARATUS FOR PROPORTIONAL VALVE ACTUATION IN A PLASMA CUTTER

CROSS-REFERENCE TO RELATED APPLICATION

This application claims the benefit of prior U.S. Provisional Application Ser. No. 61/056,993 filed May 29, 2008, and which is incorporated herein in its entirety by reference.

BACKGROUND OF THE INVENTION

The present invention relates generally to plasma cutting systems and, more particularly, to a method and apparatus for automatically controlling gas pressure for a plasma cutter.

Plasma cutting is a process in which an electric arc and plasma gas are used to cut or gouge a workpiece. Plasma cutters typically include a power source, a gas supply, such as compressed air, and a torch. The torch is constructed to create and maintain the plasma arc. To generate the plasma cutting power, a power source receives an input voltage from a transmission power receptacle or generator and provides output power to a pair of output terminals. One of the output terminals is connected to an electrode and the other is connected to the workpiece. An air supply is used with most plasma cutters to carry and propel the arc to the workpiece and assist in cooling the torch.

In order to operate properly, the plasma torch requires consistent, and preferably controllable air flow. Typically, this is provided by a system consisting of a pressure regulator; a downstream pressure gauge; a downstream, solenoid operated gas valve; and a downstream pressure limit switch. Using such a configuration, the operator is able to start and stop the gas flow as necessary, as well as access and adjust gas pressure settings to configure the plasma cutting system for a different cutting operation. While control of air pressure settings in this manner provides an operator with a great deal of control, such a construction is not without its drawbacks.

One drawback associated with existing gas pressure regulation systems, such as the one described above, is the imprecision associated with the use of mechanical regulators. An operator is required to manually check gas pressure and make adjustments by means of the pressure gauge and pressure regulator. Therefore, it would be preferable if a system were available that could dynamically control pressure regulation by an electronic means. Use of a control loop to control gas pressure, for example, could result in a more precisely tuned system and also allow for better accuracy and control of gas pressure. Such a system would also permit a faster transient response, or even allow for the gas pressure to be continuously altered, if need be.

Another drawback of existing systems is the inefficiency associated with the operator's need to adjust gas pressure settings. In a dynamic work environment, an operator may be required to perform gouging and cutting operations in a relatively continuous or alternating manner. The operator may be required to sequentially mix a plurality of cutting processes and a plurality of gouging processes. Suspending one process in order for the operator to check a pressure gauge and adjust the pressure setting for another operation is time consuming and results in overall process inefficiency. Therefore, it would be preferable if a system were available that would allow multiple pressure levels to be automatically and repeatedly set by means of multiple, selectable electrical switch positions, thus obviating the need for the user to make pressure adjustments.

In addition to providing dynamic control of the plasma torch/system for allowing multiple pressure levels to be automatically and repeatedly set by means of multiple, selectable electrical switch positions, it is also desired that the size and power requirements of the system be minimized. That is, a separate pressure regulator, pressure gauge, solenoid operated gas valve, and pressure limit switch typically included in a plasma torch can result in a bulky system that requires substantial power to operate. It would be preferable if a system were available that integrated the above listed separate elements. It would be further desirable if the power requirement to operate such an integrated system were lowered, to reduce associated operating costs.

It would, therefore, be desirable to design a plasma cutting system with simplified construction, operation, and control to ensure optimal pressure in the plasma torch, maximize efficiency and longevity in the plasma cutting system, and provide for reduced size and power requirements.

BRIEF DESCRIPTION OF THE INVENTION

The present invention provides a plasma cutting system and proportional valve that overcome the aforementioned drawbacks. The plasma cutting system includes a pressure-closing type proportional valve. The pressure closing-type proportional valve includes a plunger that is biased toward a valve orifice by way of the flow of pressurized gas into the proportional valve. An electrical solenoid in the proportional valve causes the plunger to translate the plunger relative to the orifice, thereby adjusting the effective size of the orifice to control an output gas flow toward a desired output gas flow set point.

Therefore, in accordance with one aspect of the present invention, a plasma cutting system includes a plasma torch actuated by a trigger and connected to a power source, a gas supply system constructed to provide a pressurized source of gas to the plasma torch, and a proportional valve configured to regulate the pressurized gas. The proportional valve further includes a body, a valve seat positioned within the body and defining a valve orifice, and a plunger having a mating surface on one end and a pressure receiving surface on an opposite end, the mating surface configured to mate with the valve seat and the orifice. The proportional valve also includes at least one inlet connected to receive the pressurized source of gas on one end and to distribute the pressurized gas to the valve orifice and the pressure receiving surface of the plunger, an electrical solenoid mounted in the body and having a chamber to electro-magnetically translate the plunger therein, and a bias urging the plunger toward the valve orifice in conjunction with the pressurized gas when electrical power is reduced to the electrical solenoid.

According to another aspect of the present invention, a proportional valve in a welding-type system for controlling gas flow in the welding-type system includes at least one inlet chamber connected to a gas source to receive pressurized gas therefrom, a valve chamber fluidly connected to and positioned downstream from the at least one inlet chamber, and a plunger substantially enclosed by the valve chamber and configured to translate therein between an open position and a closed position, the plunger including a mating surface on one end and a pressure receiving surface on an opposite end. The proportional valve also includes a valve seat positioned on one end of the valve chamber and adjacent the mating surface of the plunger when the plunger is in the closed position, the valve seat defining an orifice having an output gas flow therethrough when the plunger is in a position other than the closed position. A spring is also included in the proportional valve and is positioned to apply a closing force to the pressure receiving surface, the closing force applied by the spring being less than a force applied to the plunger by the pressurized gas when the plunger is in the closed position. A coil is positioned about at least a portion of the valve chamber and is configured to apply an opening force to the plunger so as to regulate the output gas flow through the orifice.

According to a further aspect of the invention, a method of controlling a gas flow in a plasma cutting system using a proportional valve includes supplying a flow of pressurized gas to at least one proportional valve inlet and transferring the flow of pressurized gas from the at least one proportional valve inlet to a valve chamber in the proportional valve, the proportional valve chamber including an orifice on one end thereof and a plunger positioned therein and configured to translate relative to the orifice between an open position and a closed position to control an output gas flow therethrough. The method also includes biasing the plunger toward the orifice by way of the flow of pressurized gas to decrease an effective size of the orifice, the gas flow having a pressure sufficient to bias the plunger to the closed position. The method further includes activating a coil positioned at least partially about the plunger to translate the plunger relative to the orifice and thereby adjust the effective size of the orifice, the effective size of the orifice being adjusted to bring the actual output gas flow toward a desired output gas flow set point.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
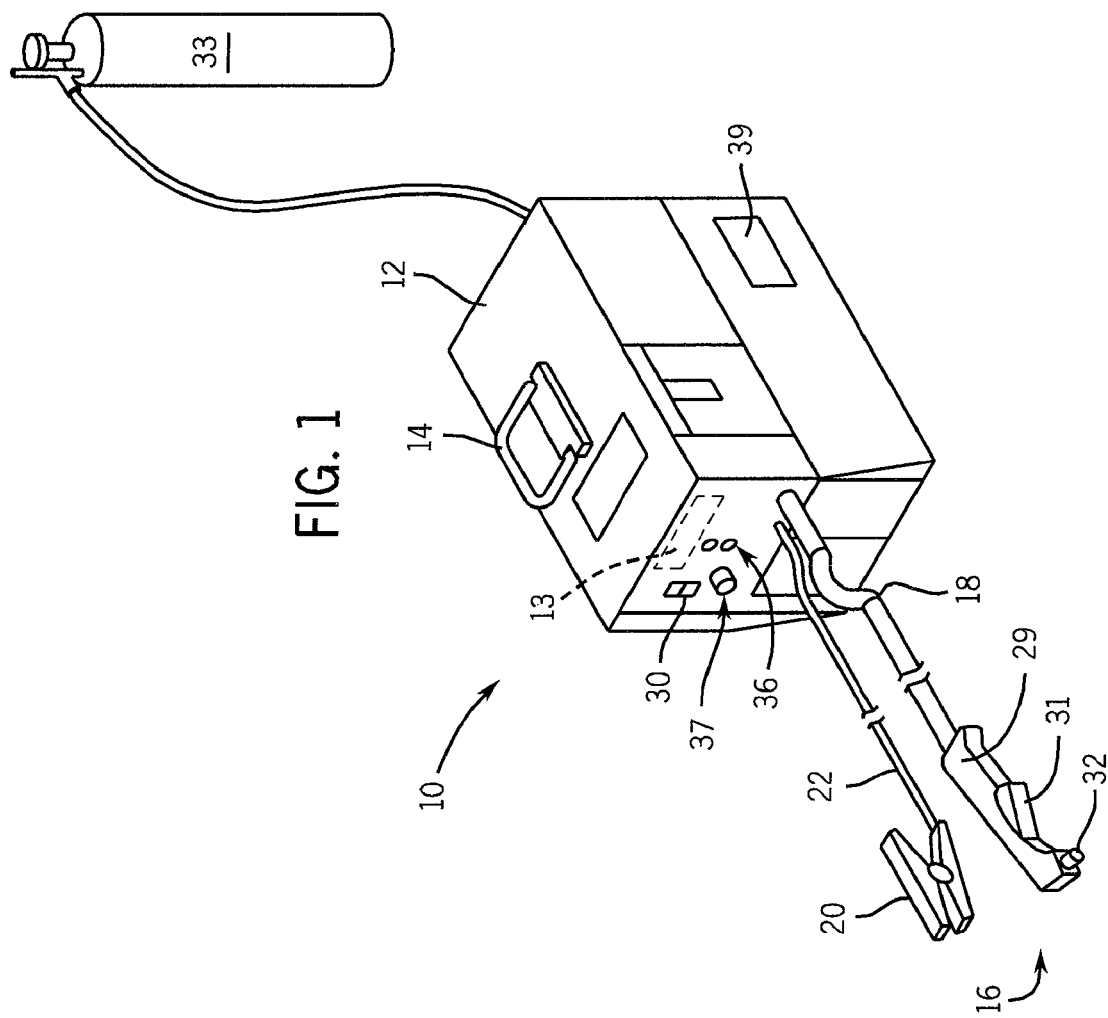
FIG. 1 is a perspective view of a plasma cutting system according to the present invention.

FIG. 1 shows a plasma cutting system 10 according to the present invention. Plasma cutting system 10 is a high voltage system with open circuit output voltages that typically range from approximately 230 Volts Direct Current (VDC) to over 300 VDC. Plasma cutting system 10 includes a power source 12 to condition raw power and generate a power signal suitable for plasma cutting applications. Power source 12 includes a controller 13 that receives operational feedback and monitors the operation of a plasma cutting system 10. Power source 12 includes a handle 14 to effectuate transportation from one site to another. Connected to power source 12 is a torch 16 via a cable 18. Cable 18 provides torch 16 with power and compressed air or gas, and also serves as a communications link between torch 16 and power source 12. Torch 16 includes a handle portion 29, or torch body, having a trigger 31 thereon and work tip 32 extending therefrom. Although shown as attached to torch 16, it is understood and within the scope of the claims that trigger 31 could be connected to power source 12 or otherwise remotely positioned relative to actuating torch 16.

Also connected to power source 12 is a work clamp 20, which is designed to connect to a workpiece (not shown) to be cut and provide a grounding or return path. Connecting work clamp 20 to power source 12 is a cable 22 designed to provide the return path, or grounding path, for the cutting current from torch 16 through the workpiece and work clamp 20. Power source 12 includes a plurality of inputs such as an ON/OFF switch 30 and may also include amperage controls and indicator lights 36. Power source 12 can include an operating mode selector 37 connected to controller 13, which allows an operator to select a desired mode of operation of the plasma cutting system 10. That is, an operator can manually configure the plasma cutting system 10 to operate in a cutting or gouging mode if the system is so equipped.

To effectuate cutting, torch 16 is placed in close proximity to the workpiece connected to clamp 20. A user then activates trigger 31 on torch 16 to deliver electrical power and compressed air to work tip 32 of torch 16 to initiate a pilot arc and plasma jet. Shortly thereafter, a cutting arc is generated as the user moves the torch to the workpiece. The arc transfers from the electrode to the workpiece through the tip. The user may then perform the desired plasma effectuated processing of the workpiece by moving torch 16 across the workpiece. The user may adjust the speed of the cut to reduce spark spatter and provide a more-penetrating cut by adjusting amperage and/or air pressure. Gas is supplied to torch 16 from a pressurized gas source 33, from an internal air compressor 39, or an air compressor (not shown) external to power source 12.

Figure 2:
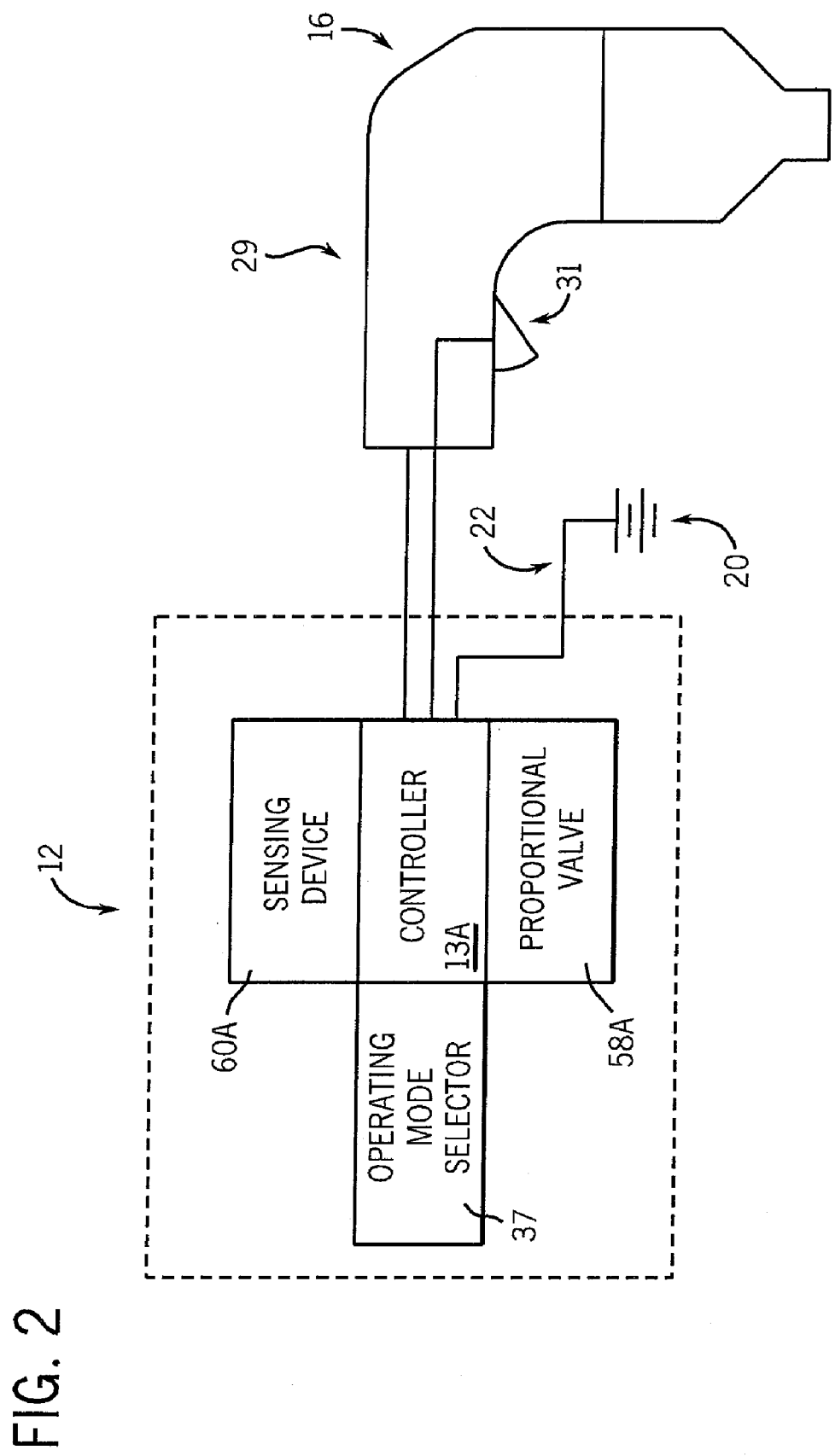
FIG. 2 is a schematic representation of the plasma cutting system shown in FIG. 1.

As shown in FIG. 2, in one embodiment, controller 13A is disposed within power source 12. Controller 13A is connected to an operating mode selector 37. Operating mode selector 37 is used to select a desired mode of operation of the plasma cutting system 10. Each mode of operation corresponds to a specific set of gas pressure and gas flow set points. The set points will exemplify ideal operating conditions for the plasma cutting system 10 for each mode of operation. Controller 13A is configured to store information regarding the gas pressure and gas flow set points for each desired mode of operation.

Controller 13A is additionally operatively connected to plasma torch 16 and trigger 31, as well as to sensing device 60A. Sensing device 60A is configured to communicate to controller 13A one of an outlet or inlet gas pressure and/or a gas flow. In one embodiment, the sensing device 60A is a pressure sensor used to measure output gas pressure. The pressure sensor can be a piezo-resistive pressure sensor or any other similar sensor capable of measuring gas pressure in a welding-type environment. A detected output gas pressure at proportional valve 58A is measured by pressure sensor 60A and communicated to controller 13A. The detected output pressure provides controller 13A with the information necessary to calculate a drive signal to be sent to proportional valve 58A, wherein the drive signal can be either of a current or a voltage. The drive signal sent to proportional valve 58A by the controller 13A thus regulates the gas pressure used in the cutting operation for the plasma cutting system 10.

Controller 13A is further configured to determine an input gas pressure in the plasma cutting system 10 as a function of output pressure and the drive signal. In one embodiment, a look-up table is used to set forth an input pressure and an output pressure associated with each of a number of cutting operations selected by way of the operating mode selector 37. Inconsistencies in the input gas pressure can then be detected by comparing an expected drive signal current or voltage to be sent to the proportional valve 58A, 58B, which is given in the look-up table for a corresponding given input and output gas pressure, to a drive signal that is actually necessary to achieve the desired output gas pressure in the plasma cutting system for the selected cutting operation. Once the trigger 31 of the plasma torch 16 is actuated, the expected drive signal and the actual necessary drive signal can be compared to determine if the actual input pressure in the plasma cutting system differs from the input pressure given in the look-up table. Controller 13A, is also configured to notify the operator that there is an out-of-spec input pressure via an indicator light 36 (shown in FIG. 1) located on face of the power supply housing 12 or through some other acceptable means.

In addition, controller 13A, is also configured to make gas pressure adjustments when the plasma cutting system 10 is set-up as having the sensing device 60A located within the power source housing 12. Controller 13A calculates a necessary gas pressure correction for a given length of torch cable 18 (shown in FIG. 1) by measuring a gas pressure fall time after the proportional valve 58A is completely closed.

Figure 3:
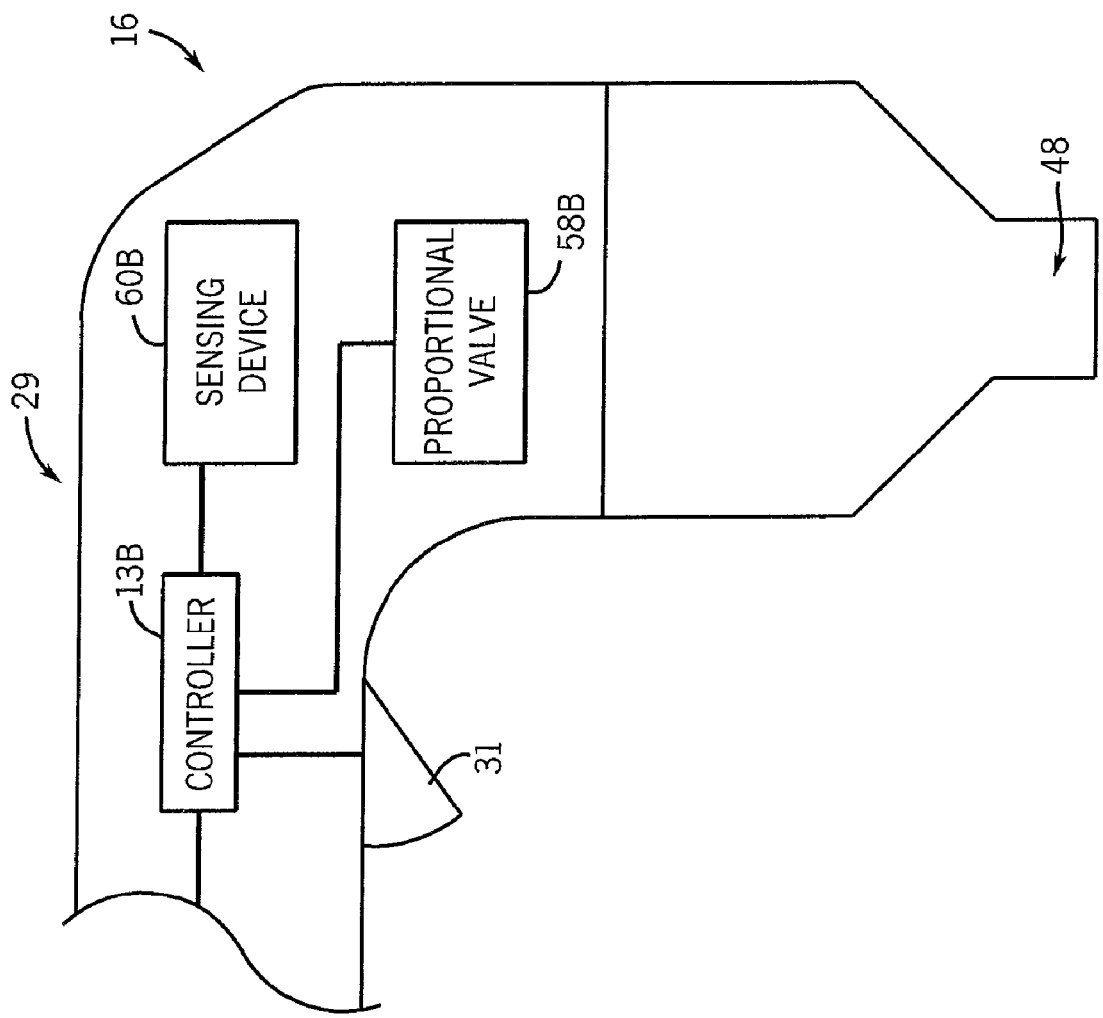
FIG. 3 is a partial schematic view of the plasma torch of the plasma cutting system shown in FIG. 1.

Referring now to FIG. 3, a plasma torch 16 is shown in cross section, which shows another embodiment of the current invention. As shown, plasma torch 16 houses a proportional valve 58B, controller 13B, and sensing device 60B. Proportional valve 58B is a solenoid-type valve that is connected to the controller 13B. Controller 13B, in turn, is connected to sensing device 60B. Such a construction allows the proportional valve 58B to be dynamically controlled by feedback communicated thereto from the controller 13B, in response to output or input gas pressure readings in the plasma cutting system 10 as measured by sensing device 60B. The proportional valve 58B then controls gas flow to the torch head nozzle 48.

Figure 4:
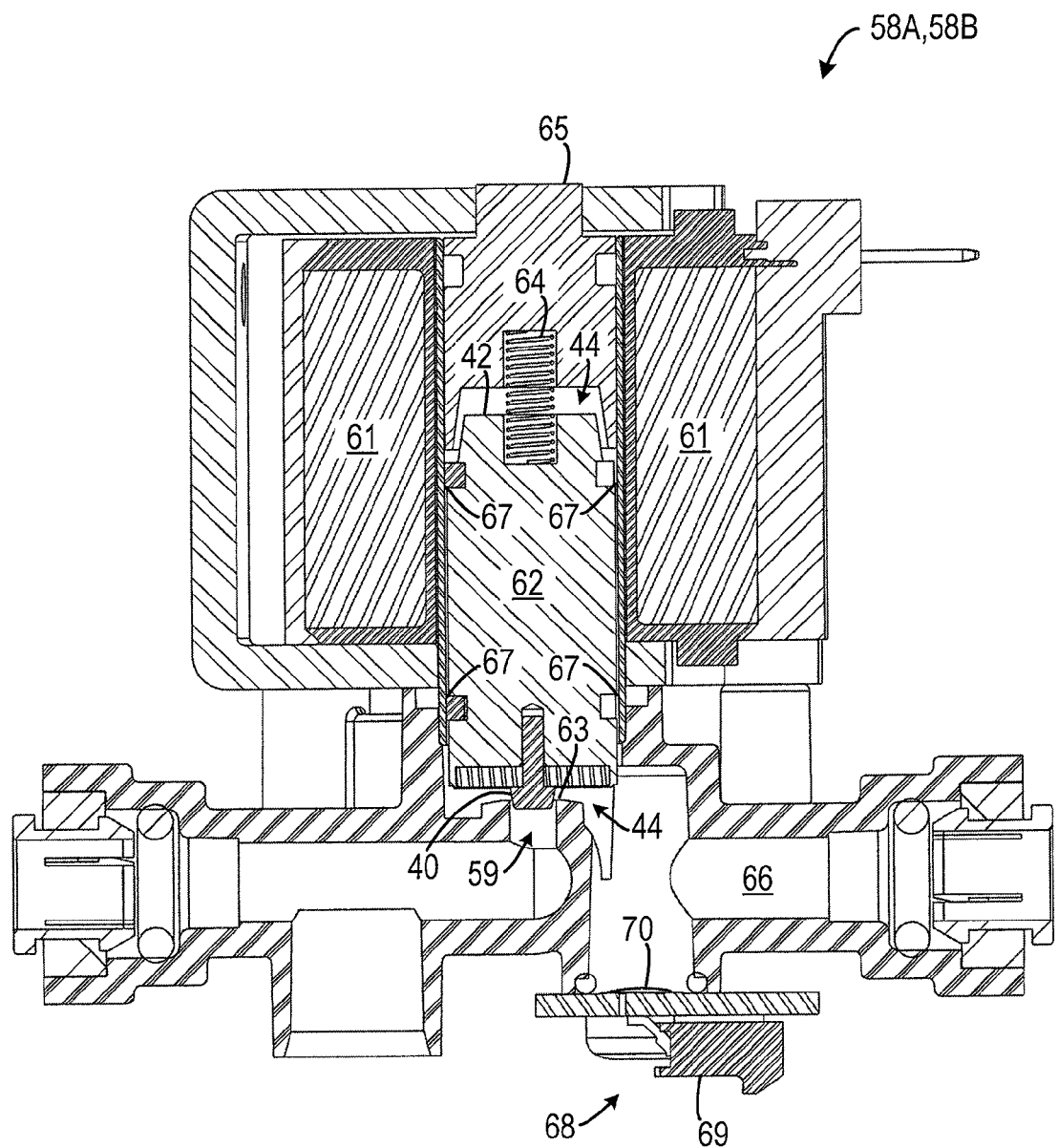
FIG. 4 is a cross sectional view of the proportional valve in the plasma cutting system of FIG. 1.

As shown in FIG. 4, the proportional valve 58A, 58B has an adjustable orifice 59 whose effective size is determined by the amount of electric current or voltage in the drive signal and running through an electrical solenoid 61 in the proportional valve. Electrical solenoid 61 can be a coil, as shown in the embodiment of FIG. 4, that generates an electro-magnetic force. As gas pressure fluctuates during a plasma cutting process, the controller 13B is able to adjust the amount of current or voltage in the drive signal sent to the electrical solenoid 61 in the proportional valve 58B and correspondingly increase or decrease the effective size of the orifice 59, thus incrementally regulating the gas pressure in the plasma cutting system 10. More specifically, the varying of a voltage or current in the drive signal sent to the electrical solenoid 61 and the resulting varying magnetic force generated thereby together with biasing forces tending to close the proportional valve 58B control the movement of a plunger 62, or similar translatable device (e.g., valve needle, valve ball), relative to the orifice to vary the effective size of the orifice 59. Plunger 62 is mounted within proportional valve 58A, 58B and is movably secured therein to a valve body 65. Plunger 62 includes a mating surface 40 on one end thereof and a pressure receiving surface 42 on an opposite end thereof. The mating surface 40 is configured to rest within a valve seat 63 surrounding orifice 59 and mate with the orifice 59. Plunger 62 is at least partially surrounded by electrical solenoid 61 (i.e., positioned within a chamber of the electrical solenoid). When a current or voltage (i.e., drive signal) is sent through the electrical solenoid 61, plunger 62 is caused to translate relative to orifice 59 and separate (i.e., move away) therefrom in response to the magnetic force, thus allowing an outlet/output air flow through orifice 59. When there is no current or voltage being sent through electrical solenoid 61, mating surface 40 of plunger 62 mates with orifice 59 in valve seat 63, thus cutting off the outlet gas flow through the orifice 59.

Figure 5:
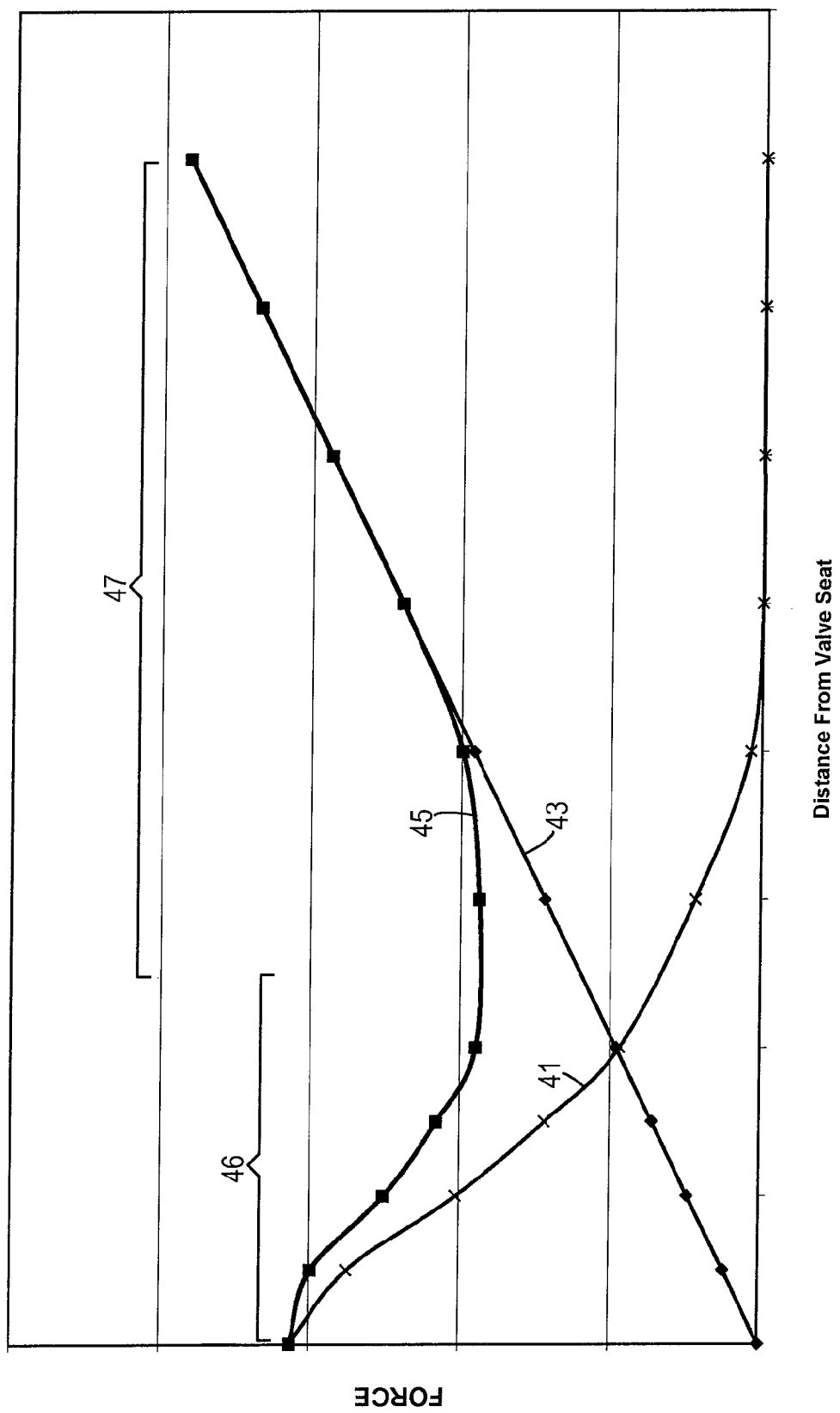
FIG. 5 is a graphical representation of forces applied to the plunger during operation of the proportional valve.

In an exemplary embodiment, proportional valve 58A, 58B is designed as an "air pressure-closing" type valve. As shown in FIG. 4, a gas flow from gas source 33 (FIG. 1) is supplied through an inlet chamber 66 into proportional valve 58A, 58B. While a single inlet chamber 66 is shown in FIG. 4, it is also recognized that an additional inlet chamber could be formed such that, for example, pressurized gas could enter proportional valve 58A, 58B at a separate location above plunger 62. The gas flow taken in through inlet chamber 66 and into proportional valve 58A, 58B flows into a downstream valve chamber 44 via a fluid connection therebetween, the valve chamber 44 generally surrounding plunger 62 and having orifice 59 formed on one end thereof. The gas flow has a closing pressure or force that is sufficient to bias plunger 62 towards orifice 59 and acts to cut off gas flow through the orifice 59. That is, upon the initiation of a gas flow through inlet chamber 66 into proportional valve 58A, 58B, and the transfer of the pressurized gas flow into valve chamber 44, plunger 62 is positioned in a default location such that it mates with orifice 59 via valve seat 63 to close the orifice and cut off the outlet gas flow therethrough. When plunger 62 is in the "closed" position, a bias or biasing mechanism 64 (e.g., a spring) exerts less closing force on the plunger 62 than the closing force exerted by the gas flow. In one embodiment, a spring 64 is in an unloaded state when plunger is in the fully closed position, such that the spring imparts little or no force (i.e., zero closing spring force) thereon. As plunger 62 moves from the closed position towards the open position (i.e., away from orifice 59), bias 64 begins to exert an increasing closing force (i.e., spring begins to load) on plunger 62 to bias the plunger back towards the closed position, as can be seen in FIG. 5. As plunger 62 moves from the closed position and away from orifice 59 (and valve seat 63) towards the open position, the closing pressure applied to the plunger by the inlet gas flow decreases, as a portion of the pressurized gas flows through orifice 59.

FIG. 5 illustrates a graphical representation of forces applied to the plunger 62 during operation of the proportional valve 58A, 58B, as a position of plunger 62 varies away from or toward the fully-closed position. Curve 41 shows the closing force exerted on plunger 62 by the pressurized gas flow as a function of the distance of the plunger from valve seat 63. Curve 43 shows the closing force exerted on plunger 62 by the biasing mechanism 64 as a function of the distance of the plunger from valve seat 63. As shown by curve 41 and curve 43 in FIG. 5, the closing force exerted by the pressurized gas flow is greater than the closing force exerted by the biasing mechanism when plunger 62 is at or near the closed position. As plunger 62 translates away from the closed position and toward the open position, the closing force applied by the pressurized gas flow decreases, while the closing force exerted by the biasing mechanism increases. FIG. 5 also shows a curve 45 illustrating the net closing force applied to plunger 62 that is a combination of the closing forces exerted by the pressurized gas flow and biasing mechanism 64. The net force curve 45 includes a negatively sloped portion, as illustrated by region 46 in FIG. 5, and a monotonic increasing portion, as illustrated by region 47 in FIG. 5. As explained in greater detail below, the drive signal applied to electrical solenoid 61 is designed to provide control of plunger 62 in region 47 of the net force curve 45 and bypass the negatively sloped region 46 of the net force curve 45, in order to provide more precise control of the plunger and regulation of the outlet gas flow.

With reference to FIGS. 4 and 5, in order to increase the effective size (i.e., opening) of orifice 59 during operation of proportional valve 58A, 58B, a current or voltage in the form of the drive signal is sent to electrical solenoid 61 that has a magnitude sufficient to "kick" open plunger 62 and overcome the force applied on plunger 62. When initially translating plunger 62 from a closed position, the drive signal sent to electrical solenoid 61 has a magnitude sufficient to overcome a closing force applied to the plunger by the inlet gas pressure, as shown in FIG. 5. As plunger 62 moves away from the closed position and further toward the open position, the drive signal sent to valve control 61 has a magnitude sufficient to overcome a closing force applied to the plunger by both the inlet gas pressure and bias 64.

As proportional valve 58A, 58B is a pressure closing type valve, it is recognized that plunger 62 cannot be controlled with any precision in any region where the force/position slope of the net force curve 45 is negative, as illustrated by region 46 in FIG. 5, but instead the force/position slope must be monotonic increasing, as illustrated by region 47 in FIG. 5. Therefore, the drive signal applied to electrical solenoid 61 must kick open plunger 62 in a fashion that bypasses the negatively sloped portion 46 of the net force curve 45 in FIG. 5. As shown in FIG. 5, a drive signal is thus applied to the plunger sufficient to kick the valve at least approximately 0.04 inches from valve seat 63, so as to provide precise control of the plunger. In one embodiment, valve control 61 is driven by a 100% duty cycle signal that acts to kick open plunger 62. Once pressure reaches a desired level, valve control 61 is driven to oscillate the valve at a frequency of 240 Hz to maintain bearing surfaces 67 on plunger 62 in dynamic friction with body 65. A flowchart illustrating a procedure to open and to ramp valve 62 into position for maintaining the desired pressure level will be discussed below with regard to FIG. 7.

Beneficially, the above described pressure closing type proportional valve 58A, 58B allows for a reduction in the amount of force that is needed to be applied to plunger 62. That is, as the supplied input gas pressure to proportional valve 58A, 58B works to close plunger 62, the bias 64 (i.e., spring) in series with plunger 62 can be reduced in size, as it no longer needs to provide a closing force for the plunger when the proportional valve 58A, 58B is in an OFF (i.e., closed) position. Additionally, the amount of force needed to be generated by valve control 61 can be reduced, as the valve control does not need to overcome a substantial closing force that is generated by bias 64 to separate plunger 62 from orifice 59 to an open position. Rather, electrical solenoid 61 needs only to overcome a lower maximum force generated by either the pressurized gas flow or a combined gas flow/bias force, either of which is lowered compared to a conventional "pressure opening" valve design (in which the spring exerts the entire closing force). Thus, according to one embodiment, electrical solenoid 61 can comprise a single coil arrangement for actuating plunger 62. Additionally the size of the single coil 61 could be reduced, as the coil 61 is not required to fight against a high tension of a spring 64 to maintain plunger 62 in an ON (i.e., open) position. The pressure closing type proportional valve 58A, 58B thus can be operated at a reduced power and with a reduced coil size, allowing for reductions of cost in manufacturing and operation thereof.

Referring still to FIG. 4, according to one embodiment of the invention, a pressure switch 68 is also included in proportional valve 58A, 58B. Pressure switch 68 allows for a precise determination to be made of when the inlet gas pressure is at an appropriate level that allows for optimal operation of proportional valve 58A, 58B. In an exemplary embodiment, pressure switch 68 includes a printed circuit board (PCB) 69 and a tactile dome switch 70. The dome switch 70 is designed to actuate at a specific inlet gas pressure and create an electrical connection on the PCB 69. A signal is then transmitted from pressure switch 68 via an electrical connection (not shown) to, for example, cause illumination of a light emitting diode (LED) display, to indicate to an operator that sufficient pressure is available to proportional valve 58A, 58B to allow for operation thereof and performance of a desired cutting operation. According to one embodiment of the invention, pressure switch is configured to generate an alert (i.e., audible/visual alert) if the dome switch 70 is not actuated within a pre-determined period of time from start-up of the plasma torch.

As set forth above with respect to FIGS. 2 and 3, a sensing device 60A, 60B can also positioned downstream of proportional valve 58A, 58B. Sensing device 60A, 60B measures the resulting regulated gas pressure (i.e., outlet gas flow/pressure) and forms part of a closed loop control that actively monitors the regulated gas pressure and feeds that data to control software (i.e., controller 13A, 13B of FIGS. 2 and 3), thus allowing for adjustment of the drive signal sent to electrical solenoid 61.

Figure 6:
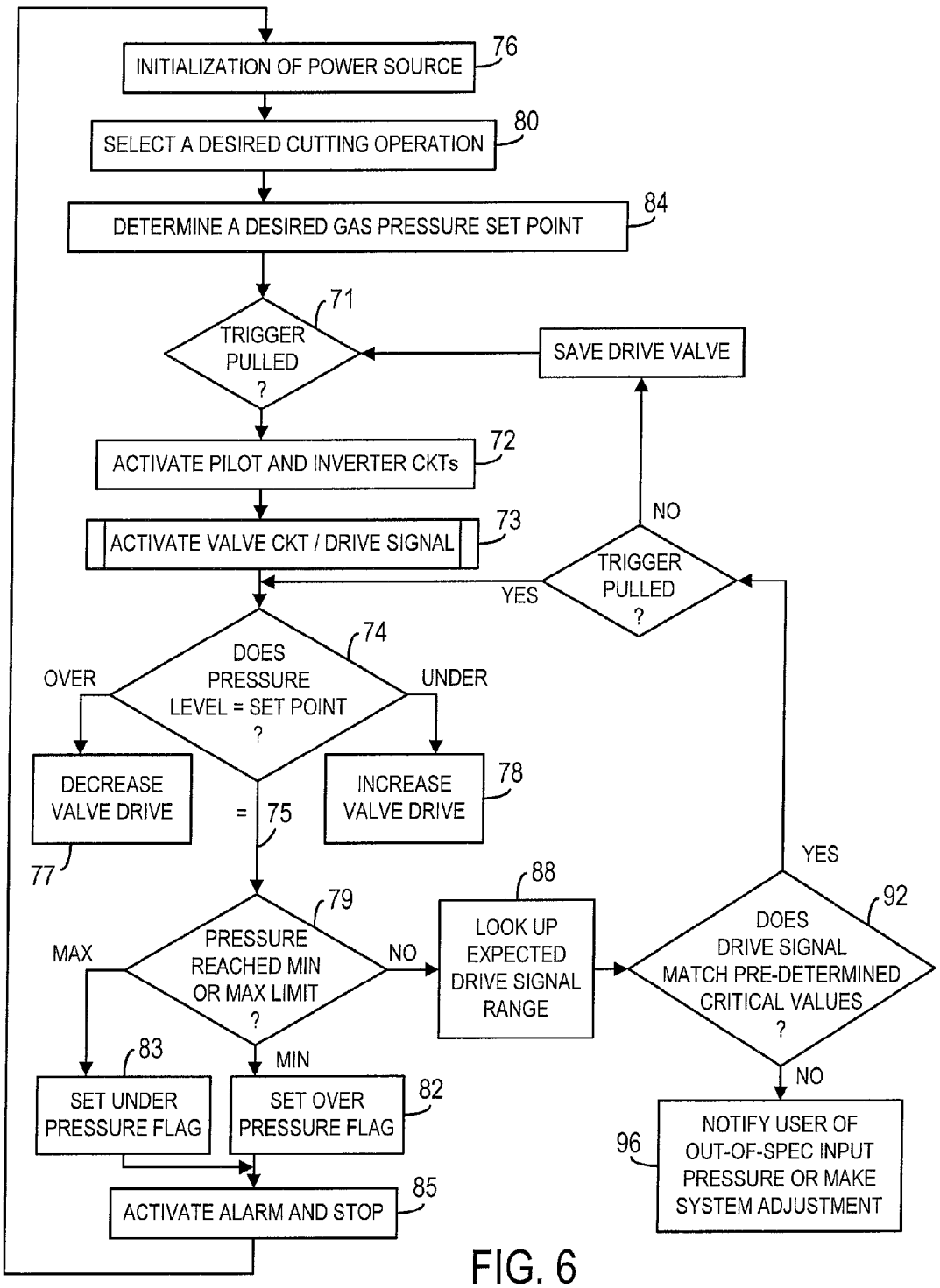
FIG. 6 is a flow chart showing a detailed description of the operation of the proportional valve and the plasma cutting system.

In FIG. 6, a more detailed description of the operation of one embodiment of the plasma cutting system and proportional valve is set forth. The process begins with operator initialization of the power source 76. Operator then selects a desired cutting operation to be performed 80 by the plasma cutting system. Upon selection of the cutting operation, the process determines a target or gas pressure set point or threshold 84 for the specified operation. Once the trigger of the plasma torch is pulled 71, the process is allowed to continue. Upon actuation of the trigger, a pilot arc is activated along with an inverter to power the plasma cutting system to enable an operator to begin a cutting process 72. Gas is supplied to the proportional valve through an inlet at a controlled inlet pressure and the proportional valve is activated by way of a drive signal subroutine so as to begin regulation of the gas flow in the plasma cutting system 73.

Figure 7:
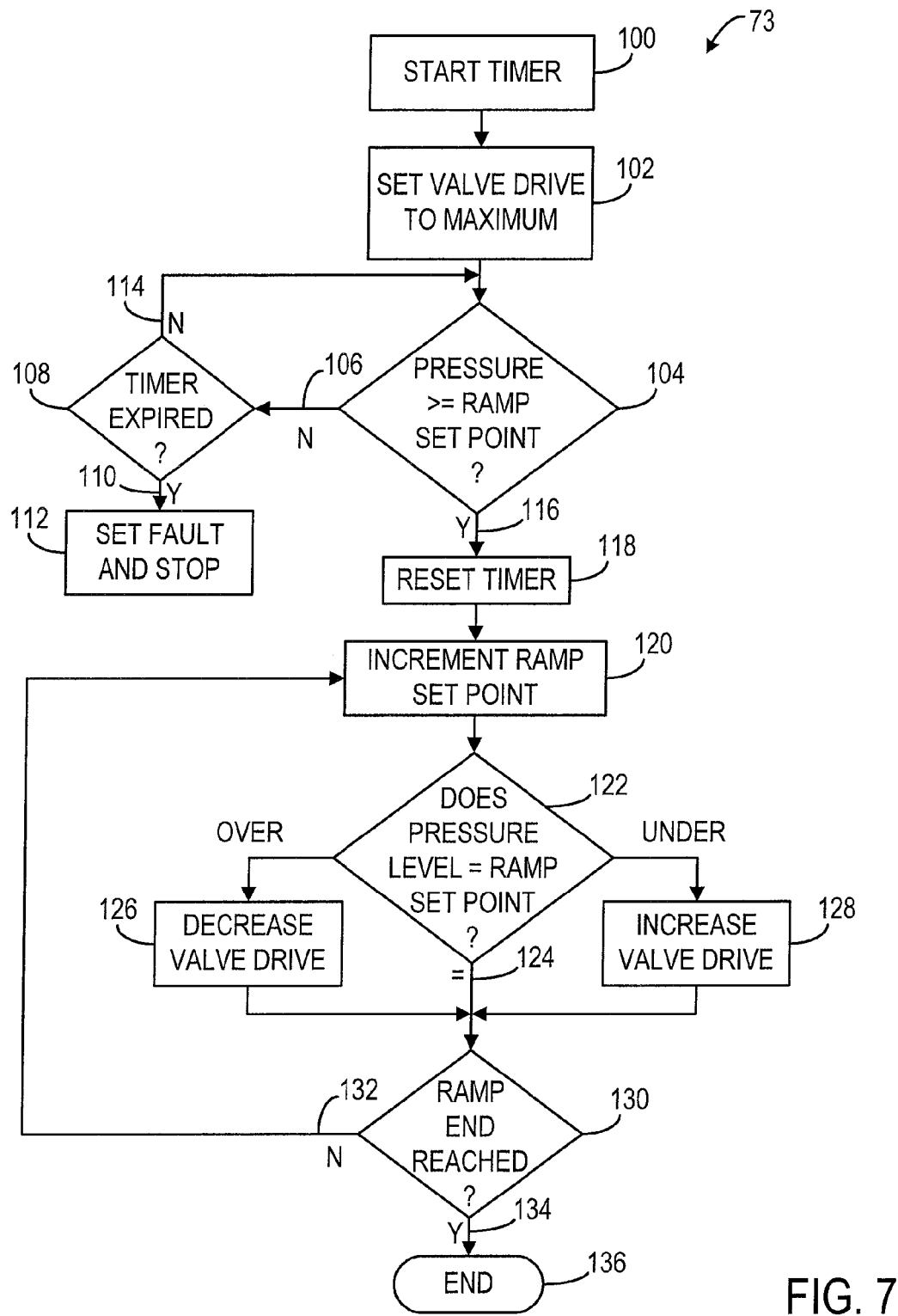
FIG. 7 is a flow chart showing a valve opening subroutine of the flow chart of FIG. 6.

Referring now to FIG. 7, the activate valve circuit subroutine 73 of FIG. 6 is shown. The process begins with initialization of a timer 100. As stated above, it is desirable to "kick" open plunger 62 to bypass the negatively-sloped portion 46 of the net force of net force curve 45 in FIG. 5. Accordingly, the drive signal sent to a control in the proportional valve is set to a full-open or maximum value 102 via a full-open, or full-boost or kick-open, drive signal to increase the effective size of the orifice in the proportional valve by repositioning the plunger 62 toward the fully-open position, thus raising the output gas pressure downstream from the orifice. The output gas pressure is measured and compared with a ramp start set point or threshold 104, which is a percentage of the gas pressure set point determined for the cutting operation that results in an open position of plunger 62 being within the positively-sloped portion 47 of the net force curve 45 in FIG. 5 but less than a position at which the gas pressure set point is reached. If the measured pressure is less than the ramp set point pressure 106, the timer is checked to see if it has expired 108. If the timer has expired 110, a fault, such as a low pressure fault, is set and the cutting process is stopped 112. If the timer has not expired 114, then process control returns to measure and compare the downstream pressure with the ramp set point pressure 104. If the measured downstream pressure is greater than or equal to the ramp set point pressure 116, the opening of plunger 62 is considered to be within the controllable positively-sloped portion of the force/position curve in FIG. 5.

The timer is reset 118, and the process enters a ramping stage toward the gas pressure set point determined for the cutting operation. In the ramping stage, a ramp drive signal controls the air pressure-closing proportional valve to minimize overshoot. According to an embodiment of the invention, the ramp drive signal is a pulse-width-modulated (PWM) signal that drives the air pressure-closing proportional valve away from the fully-closed position more slowly than the full-boost drive signal. It is noted that the coil inductance of electrical solenoid 61 (FIG. 4) integrates the PWM signal, such that the signal is smoothed so as to form rippled pulses. Accordingly, the ramp set point is incremented toward the gas pressure set point 120. According to an embodiment of the invention, the ramp pressure set point is increased based on a value of the timer. The output gas pressure level at the proportional valve is then measured to determine whether the pressure level matches with the ramp pressure set point 122. If the outlet gas pressure in the valve corresponds to the ramp pressure set point, no adjustments to the outlet gas pressure level are made at that time and the ramp drive signal to the valve remains the same 124. If the outlet pressure level is greater than that desired, the ramp drive signal will be decreased to reposition the plunger closer to the fully-closed position, thereby reducing the output gas pressure down to the desired level 126. If the pressure level at the proportional valve is less than the desired pressure, the ramp drive signal will be increased to reposition the plunger closer to the fully-open position, thus raising the output gas pressure up to the level determined by the ramp set point 128.

After any necessary adjustments to the outlet gas pressure have been made to bring pressure to the ramp set point, the process determines whether the ramp end has been reached 130. According to an embodiment of the invention, the ramp end may be reached when the ramp set point substantially equals the gas pressure set point and when the outlet gas pressure has been raised to the level determined by the ramp set point. If the ramp end has not been reached 132, the process returns to increment the ramp set point toward the gas pressure set point 120. If the ramp end has been reached 134, the activate valve circuit subroutine 73 terminates 136, and process control returns to the process of FIG. 6 for full pressure control of plunger 62 where the drive signal is controlled by a pressure-maintaining drive signal to maintain the pressure at the output of the proportional valve at or near the outlet gas pressure set point. According to an embodiment of the invention, the pressure-maintaining drive signal is a pulse-width-modulated (PWM) signal.

Referring again to FIG. 6, after subroutine 73 has controlled the opening of plunger 62 from the closed position to an open position such that the outlet gas pressure has reached the gas pressure set point, the output gas pressure level at the proportional valve is then measured to determine whether the pressure level matches with the desired gas pressure set point associated with the cutting operation being performed 74. If the outlet gas pressure in the valve corresponds to the desired outlet gas pressure, no adjustments to the outlet gas pressure level are made at that time and the drive signal to the valve remains the same 75. If the outlet pressure level is greater than that desired, the drive signal sent to a control (i.e. electrical solenoid) in the proportional valve will be decreased so as to decrease valve drive and the effective size of an orifice in the proportional valve by repositioning a plunger relative thereto and reducing the effective size of the orifice, thereby reducing the output gas pressure down to the desired level 77. If the pressure level at the proportional valve is less than the desired pressure, the drive signal sent to a control in the proportional valve will be increased so as to increase valve drive and thereby increase the effective size of the orifice in the proportional valve by repositioning the plunger, thus raising the output gas pressure up to the desired level 78. As set forth above with respect to FIG. 4, the proportional valve is a pressure closing type valve, and thus the force applied to plunger to adjust the position thereof is of a magnitude sufficient to overcome the inlet gas pressure applied to the plunger to bias the valve to a closed position.

After any necessary adjustments to the outlet gas pressure have been made to bring pressure to the desired gas pressure set point, the valve drive limit is monitored to determine whether a minimum or maximum valve drive limit has been reached 79. If the minimum or maximum valve drive limit has been reached, a "set over" pressure flag or "set under" pressure flag is respectively set 82, 83. Upon one of the above flags being set, an alarm is activated in the plasma cutting system to notify the operator 85. The operator is thus able to stop the cutting process if required and necessary adjustments to the plasma cutting system can be made. If the valve drive limit has not been reached, the plasma cutting system continues to operate and the cycle is repeated wherein the output gas pressure level at the proportional valve is measured to determine whether it equals the gas pressure set point and whether any additional adjustments are required to reach the desired gas pressure set point 81.

Additionally, the process set forth in FIG. 6 can determine input gas pressure as a function of output gas pressure and drive signal. After it has been determined that the drive signal has not exceeded a max or min limit 79, the actual drive signal sent to the proportional valve can be compared to an expected drive signal (associated with the selected cutting process). In one embodiment, a look-up table is used to look-up the expected drive signal range 88 associated with a given input and output gas pressure. The actual drive signal sent to the proportional valve is then compared to the expected drive signal to determine if the actual drive signal matches expected pre-determined critical values 92. Thus, by looking at the actual and expected drive signals, it can be determined if the actual input gas pressure corresponds to the predicted pressure. If the drive signal values match, no action is taken and the cycle is repeated wherein the output gas pressure level at the proportional valve is measured to determine whether it equals the gas pressure set point and whether any additional adjustments are required to reach the desired gas pressure set point 81. If the drive signal values do not match, the user is notified of an out-of-spec input pressure, or alternatively, the plasma cutting system makes the necessary adjustments 96. As an example, if the input pressure is too low, then the drive signal required to meet the desired output pressure will exceed the expected value. The user can then be notified of such error or the system can dynamically adjust itself to address the problem.

The method shown in FIGS. 6 and 7 can also be modified to control gas flow in a plasma cutting system rather than gas pressure. A gas flow set point and gas flow readings would be used rather than gas pressure in such a method. Additionally, input gas pressure can be detected rather than output gas pressure. Furthermore, in an embodiment of the invention, controller 13B of plasma torch 16 may be configured to execute the methods shown in FIGS. 6 and 7.

It should be noted that the valve identified as a "proportional valve" in the above description, is not limited to a valve whose flow rate or pressure is directly proportional to voltage or current applied to its control. Rather, it is meant to imply a valve whose output changes incrementally with applied voltage or current and is not an "on-off" type valve. Voltage or current can be used to determine the valve limits, as can an auxiliary position indicator in communication with the moving part of the solenoid in the valve. There may also be other additional ways to determine valve position or the limits of its operation.

It should further be noted that while the electrical solenoid in proportional valve is set forth above as electro-magnetically causing translation of the plunger, it is also recognized that other electro-mechanical mechanisms/forces could be employed to cause separation of plunger from the orifice. It is envisioned, for example, that solenoid/coil could be formed of a magneto-strictive material, piezo-electric material, or a shape memory alloy, such that translation of the plunger occurs when an electrical power or magnetic field is applied to the solenoid. It is recognized that the control scheme of the proportional valve set forth in detail above could be used to control a proportional valve incorporating such materials and/or mechanisms for translating the plunger.

Therefore, according to one embodiment of the present invention, a plasma cutting system includes a plasma torch actuated by a trigger and connected to a power source, a gas supply system constructed to provide a pressurized source of gas to the plasma torch, and a proportional valve configured to regulate the pressurized gas. The proportional valve further includes a body, a valve seat positioned within the body and defining a valve orifice, and a plunger having a mating surface on one end and a pressure receiving surface on an opposite end, the mating surface configured to mate with the valve seat and the orifice. The proportional valve also includes at least one inlet connected to receive the pressurized source of gas on one end and to distribute the pressurized gas to the valve orifice and the pressure receiving surface of the plunger, an electrical solenoid mounted in the body and having a chamber to electro-magnetically translate the plunger therein, and a bias urging the plunger toward the valve orifice in conjunction with the pressurized gas when electrical power is reduced to the electrical solenoid.

According to another embodiment of the present invention, a proportional valve in a welding-type system for controlling gas flow in the welding-type system includes at least one inlet chamber connected to a gas source to receive pressurized gas therefrom, a valve chamber fluidly connected to and positioned downstream from the at least one inlet chamber, and a plunger substantially enclosed by the valve chamber and configured to translate therein between an open position and a closed position, the plunger including a mating surface on one end and a pressure receiving surface on an opposite end. The proportional valve also includes a valve seat positioned on one end of the valve chamber and adjacent the mating surface of the plunger when the plunger is in the closed position, the valve seat defining an orifice having an output gas flow therethrough when the plunger is in a position other than the closed position. A spring is also included in the proportional valve and is positioned to apply a closing force to the pressure receiving surface, the closing force applied by the spring being less than a force applied to the plunger by the pressurized gas when the plunger is in the closed position. A coil is positioned about at least a portion of the valve chamber and is configured to apply an opening force to the plunger so as to regulate the output gas flow through the orifice.

According to yet another embodiment of the present invention, a method of controlling a gas flow in a plasma cutting system using a proportional valve includes supplying a flow of pressurized gas to at least one proportional valve inlet and transferring the flow of pressurized gas from the at least one proportional valve inlet to a valve chamber in the proportional valve, the proportional valve chamber including an orifice on one end thereof and a plunger positioned therein and configured to translate relative to the orifice between an open position and a closed position to control an output gas flow therethrough. The method also includes biasing the plunger toward the orifice by way of the flow of pressurized gas to decrease an effective size of the orifice, the gas flow having a pressure sufficient to bias the plunger to the closed position. The method further includes activating a coil positioned at least partially about the plunger to translate the plunger relative to the orifice and thereby adjust the effective size of the orifice, the effective size of the orifice being adjusted to bring the actual output gas flow toward a desired output gas flow set point.

As one skilled in the art will fully appreciate, the heretofore description of a plasma cutting system is one example of a plasma cutting system according to the present invention. The description of the present invention is merely exemplary in nature and, thus, variations that do not depart from the substance of the invention are intended to be within the scope of the invention. Such variations are not to be regarded as a departure from the spirit and scope of the appending claims.

What is claimed is:

1. A plasma cutting system comprising:
    a plasma torch actuated by a trigger and connected to a power source;
    a gas supply system constructed to provide a pressurized source of gas to the plasma torch; and
    a proportional valve configured to regulate the pressurized gas, the proportional valve comprising:
        a body;
        a valve seat positioned within the body and defining a valve orifice;
        a plunger having a mating surface on one end and a pressure receiving surface on an opposite end, the mating surface configured to mate with the valve seat and the orifice;
        at least one inlet connected to receive the pressurized source of gas on one end and to distribute the pressurized gas to the valve orifice and the pressure receiving surface of the plunger;
        an electrical solenoid mounted in the body and having a chamber to electro-magnetically translate the plunger therein;
        a bias urging the plunger toward the valve orifice in conjunction with the pressurized gas when electrical power is reduced to the electrical solenoid; and
        a pressure switch positioned upstream from the valve orifice, the pressure switch including a tactile dome switch configured to actuate at a pre-determined inlet gas pressure.

2. The plasma cutting system of claim 1 wherein the bias has a spring force that is sized to urge the plunger toward the valve orifice and is less than an operating pressurized gas when in a closed or closing position.

3. The plasma cutting system of claim 1 wherein the electrical solenoid is configured to generate an electromagnetic force in response to the electrical power, the electromagnetic force sufficient to overcome the bias and the pressurized gas and thereby cause translation of the plunger away from the valve orifice so as to increase an outlet gas flow through the valve orifice.

4. The plasma cutting system of claim 1 wherein the electrical solenoid comprises a single coil.

5. The plasma cutting system of claim 1 further comprising a controller configured to regulate the electrical power transmitted to the electrical solenoid, wherein an outlet gas flow through the valve orifice is blocked when the electrical power is terminated.

6. The plasma cutting system of claim 1 further comprising a sensing device positioned downstream of the valve orifice to measure an outlet gas flow of gas flowing through the valve orifice, and wherein, based on the measured outlet gas flow, the controller alters the electrical power to the electrical solenoid to achieve a desired pressure set point.

7. The plasma cutting system of claim 1 wherein the electrical power comprises a pulse width modulated (PWM) signal.

8. The plasma cutting system of claim 1 wherein the bias increases as the plunger moves away from the valve orifice.

9. The plasma cutting system of claim 1 wherein the pressure switch is further configured to generate an alert if the tactile dome switch is not actuated within a pre-determined period of time from start-up of the plasma torch.

10. A proportional valve in a welding-type system for controlling gas flow in the welding-type system, the proportional valve comprising:
at least one inlet chamber connected to a gas source to receive pressurized gas therefrom;
a valve chamber fluidly connected to and positioned downstream from the at least one inlet chamber;
a plunger substantially enclosed by the valve chamber and configured to translate therein between an open position and a closed position, the plunger including a mating surface on one end and a pressure receiving surface on an opposite end;
a valve seat positioned on one end of the valve chamber and adjacent the mating surface of the plunger when the plunger is in the closed position, the valve seat defining an orifice having an output gas flow therethrough when the plunger is in a position other than the closed position;
a spring positioned to apply a closing force to the pressure receiving surface, the closing force applied by the spring being less than a force applied to the plunger by the pressurized gas when the plunger is in the closed position;
a coil positioned about at least a portion of the valve chamber and configured to apply an opening force to the plunger so as to regulate the output gas flow through the orifice; and
a pressure switch positioned in the inlet chamber, the pressure switch including a tactile dome switch configured to actuate at a predetermined inlet chamber gas pressure.

11. The proportional valve of claim 10 wherein the plunger is configured to be biased towards the closed position in response to a closing force exerted thereon by the pressurized gas flowing from the inlet chamber to the valve chamber.

12. The proportional valve of claim 11 wherein the coil is configured generate an opening force sufficient to overcome the pressurized gas closing force to cause translation of the plunger toward the open position.

13. The proportional valve of claim 11 wherein the closing force exerted by the pressurized gas on the plunger decreases as the plunger moves toward the open position.

14. The proportional valve of claim 11 wherein the spring is configured to apply a closing force on the plunger greater than the pressurized gas closing force exerted on the plunger when the plunger is in the open position.

15. The proportional valve of claim 10 wherein the coil is configured to generate an electromagnetic force.

16. The proportional valve of claim 10 wherein the pressure switch is further configured to generate an alert if the tactile dome switch is not actuated within a pre-determined period of time from start-up of the welding-type system.

17. A method of controlling a gas flow in a plasma cutting system using a proportional valve, the method comprising:
supplying a flow of pressurized gas to at least one proportional valve inlet;
transferring the flow of pressurized gas from the at least one proportional valve inlet to a valve chamber in the proportional valve, the proportional valve chamber including an orifice on one end thereof and a plunger positioned therein and configured to translate relative to the orifice between an open position and a closed position to control an output gas flow therethrough;
biasing the plunger toward the orifice by way of the flow of pressurized gas to decrease an effective size of the orifice, the gas flow having a pressure sufficient to bias the plunger to the closed position;
activating a coil positioned at least partially about the plunger to translate the plunger relative to the orifice and thereby adjust the effective size of the orifice, the effective size of the orifice being adjusted to bring the actual output gas flow toward a desired output gas flow set point; and
actuating a pressure switch positioned upstream from the orifice at a predetermined inlet gas pressure.

18. The method of claim 17 further comprising biasing the plunger toward the orifice by way of a spring force when the plunger is at a position other than the closed position.

19. The method of claim 17 wherein activating the coil further comprises transmitting a drive signal from a controller to the coil, the drive signal comprising one of a voltage signal and a current signal.

20. The method of claim 19 further comprising:
sensing one of a pressure and a flow rate of the output gas flow;
generating feedback based on the sensed one of the pressure and flow rate of the output gas flow;
transmitting the feedback to the controller; and
adjusting the drive signal transmitted to the coil based on the feedback.

21. The method of claim 17, further comprising generating an alert if the pressure switch is not actuated within a pre-determined period of time from start-up of the plasma cutting system.

* * * * *